United States Patent [19]

Johnson, Sr.

[11] 4,338,189

[45] Jul. 6, 1982

[54] OIL RECONDITIONING DEVICE

[76] Inventor: Lester L. Johnson, Sr., 5181 River Bluff La., Jacksonville, Fla. 32211

[21] Appl. No.: 246,684

[22] Filed: Mar. 23, 1981

[51] Int. Cl.³ .................... B01D 27/08; B01D 35/18
[52] U.S. Cl. .................................. 210/180; 210/184; 210/436; 210/443; 196/46.1
[58] Field of Search ............... 210/168, 180, 184, 436, 210/443, 444; 196/46.1

[56] References Cited

U.S. PATENT DOCUMENTS

| | | | |
|---|---|---|---|
| 2,110,124 | 3/1938 | Fitzgerald | 210/168 |
| 2,173,631 | 9/1939 | Niedens | 210/180 |
| 2,206,358 | 7/1940 | Koinzan | 210/168 |
| 2,274,132 | 2/1942 | Ehlers | 210/180 |
| 2,346,042 | 4/1944 | Morris | 210/184 |
| 2,377,988 | 6/1945 | Braun | 210/184 |
| 2,909,284 | 10/1959 | Watkins | 210/180 |
| 4,006,084 | 2/1977 | Priest | 210/180 |

*Primary Examiner*—Ernest G. Therkorn
*Attorney, Agent, or Firm*—Arthur G. Yeager

[57] ABSTRACT

In an oil reconditioning device including a housing, a contaminated oil inlet, a filter chamber in the housing, and an upper chamber in the housing where the oil from the filter chamber drains into said outlet; the improvement which comprises a lower oil receiving chamber in the housing a plurality of spaced conduits connecting said upper chamber with said lower oil receiving chamber and an outlet in said oil receiving chamber for delivering purified oil therefrom. The oil reconditioning device of this invention eliminates problems of overflow and of engine blow by when the device is tilted at steep angles encountered in use.

13 Claims, 3 Drawing Figures

OIL RECONDITIONING DEVICE

BACKGROUND OF THE INVENTION

Lubricating oil used in internal combustion engines rapidly becomes contaminated with dust, dirt, and solid particles of all kinds, and also becomes contaminated with water, petroleum fuels, etc. during its normal use. If the lubricating oil is to serve its intended purpose it must be continuously filtered and purified to remove these contaminants. Typical oil filters which are known to being use to remove such contaminants are disclosed in U.S. Pat. Nos. 3,616,885 and 4,006,084 issued to G. R. Priest. These devices involve a housing with an oil inlet in the bottom of the housing leading into a large filter chamber, normally filled with fibrous material to remove solid contaminants in the oil. The oil passes upwardly through the filter chamber and then through a felt pad into an upper chamber where the oil is subjected to heat to cause vaporization of liquid contaminants, and the vapors are vented off into the atmosphere. The oil passing through the felt pad is conducted to the interior of a hollow conical element having its outside surface in the shape of a series of tiers over which the oil is cascaded downwardly. The oil passes from the inside to the outside of the conical element through a plurality of small channels leading to the uppermost tier of the conical surface. As the oil cascades downwardly over the series of tiers it is heated, causing the liquid contaminants to vaporize and be vented off into the atmosphere while the purified oil collects at the bottom of the cascade and is drained away through the outlet.

While these prior art devices do an admirable job of purifying the oil when the reconditioning device is maintained in a relatively stable upright position, they do not function well when the device is tilted at a severe angle from the upright position. Oil reconditioning devices of this type are employed on equipment such as tractors, bulldozers, earthmoving equipment, mining equipment, etc which are frequently operated at steep angles. When such a condition occurs, the oil in the reconditioning device may be lost out the vent or short-circuited and drained away through the outlet line without being subjected to sufficient vaporization processing or of the filtering to be completely reconditioned. Furthermore, when these conditions occur there may be an engine "blow by" wherein the oil pressure is lost, the moving parts of the engine are not adequately lubricated, and the engine may be seriously damaged.

It is an object of this invention to provide an oil reconditioning device which can function in almost any degree of tilt without sacrificing any of its purification capabilities, and without permitting a loss in oil pressure. Other objects will appear from a more detailed description of this invention which follows.

BRIEF SUMMARY OF THE INVENTION

This invention provides an improved oil reconditioning device which includes a housing, an inlet at the lower end of the housing leading into a filter chamber in the central portion of housing for removing solid contaminants, an upper chamber for receiving oil from said filter chamber the improvement which comprises a purified oil receiving chamber in said housing located below said filter chamber a plurality of spaced conduits communicating between said upper chamber and said purified oil receiving chamber, and an outlet in said purified oil receiving chamber for delivering purified oil therefrom. In one embodiment of this invention said upper chamber includes a element which is heated to a temperature sufficient to cause vaporization of liquid contaminants in the oil and the vaporized contaminants are expelled through a vent to the surrounding atmosphere.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
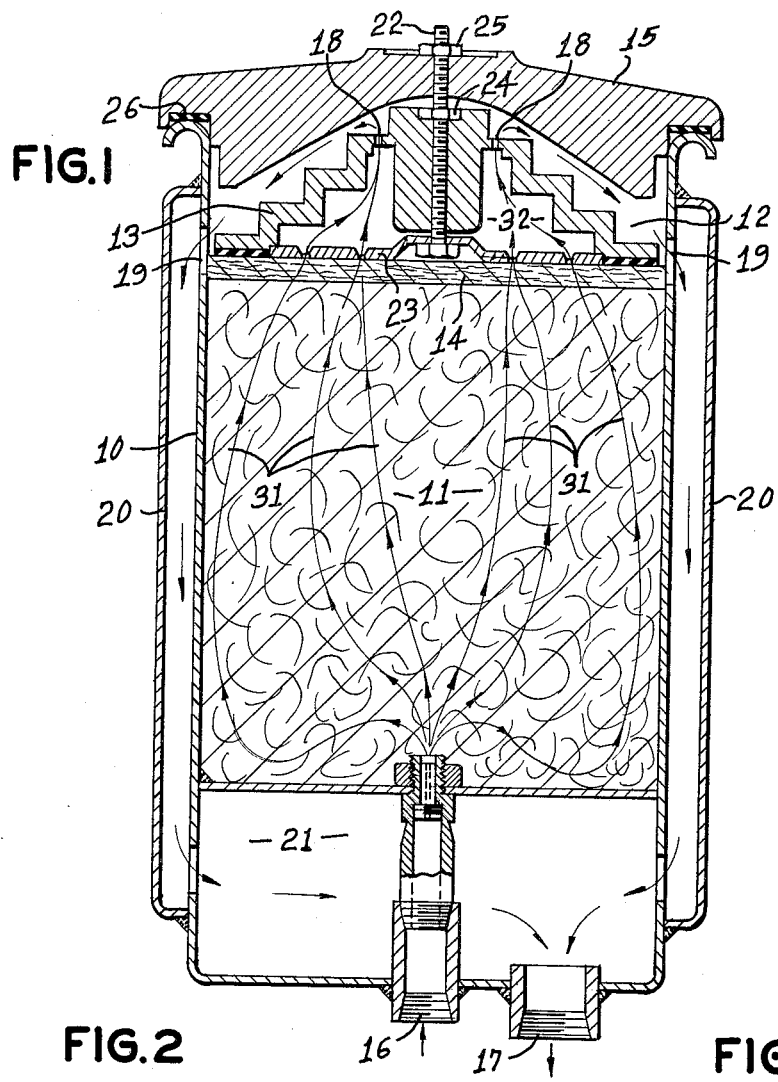
FIG. 1 is an elevational view in cross section of one of the embodiments of this invention.

The details of the oil reconditioning device of this invention can best be described by reference to FIGS. 1-2. The device comprises a generally cylindrical housing 10 in the form of an open top container with a removable lid 15. Contaminated oil from an engine or other oil-using equipment is introduced into the device through inlet port 16 and after being reconditioned is returned through outlet port 17 to the engine or equipment for reuse. The interior space of housing 10 is divided into three general components including an oil receiving chamber 21 as the lower compartment, a filter chamber 11 as the central compartment, and an upper treatment chamber 12 as the upper compartment.

Oil is introduced through inlet port 16 to the bottom of filter chamber 11 which is filled with any suitable material for filtering solid contaminants from the oil. Cotton fiber material is a preferred filler for the filter chamber of the reconditioning device. On the top of the fibrous material in the filter chamber is placed a thick felt pad 14 which holds the filter material in chamber 11 in place, and permits the oil to pass therethrough. Immediately above filter pad 14 is retainer bracket plate 23 which is fastened to element 13 by bolt 22 and nut 24. Bolt 22 is also used to fasten lid 15 onto housing 10. Bracket plate 23 is a rigid structure that extends substantially across the inside space 32 at the bottom of element 13 and contains sufficient openings or passageways to permit unimpeded flow of oil from filter chamber 11 to space 32. The combination of element 13 and bracket plate 23 is attached to housing 10 by a spaced series of lugs 35 on the inside surface of housing 10 that cooperate with a spaced series of slots 36 in the lower tier of element 13, such that element 13 can be depressed below the lugs 35 when the slots 36 and lugs 35 are aligned, and then by rotating element 13 to place the slots 36 and lugs 35 out of alignment, the upward pressure of the compressed fiber material through felt pad 14 holds the element firmly in place. Other methods of temporarily fastening element 13 to housing 10 are equally operable so long as it can be removed to provide access to filter chamber 11.

Upper treatment chamber 12 contains a hollow, convex frustoconical element 13 with its outside surface arranged in a series of tiers or steps over which the oil may cascade downwardly from the upper levels to the lower levels. Frustoconical element 13 is a hollow, convex article which receives the oil from filter chamber 11 into its inside space 32 and permits it to flow outwardly through ports 18 in the upper tier of element 13. The oil flows outwardly through ports 18 and then downwardly over the outside surface cascading over the several tiers until it reaches the lowest level near the wall of housing 10.

Bolt 22 has its bolthead engaged by bracket plate 23 and joins frustoconical article 13 to bracket 23 by reason of clamping nut 24 at the top level of that article. Lid 15 is then clamped downwardly upon the upper lip of housing 10 by holding nut 25. In order to prevent leakage gasket 26 functions as a seal between lid 15 and the upper lip of housing 10.

A plurality of spaced, vertical conduits 20 join upper treatment chamber 12 with oil receiving chamber 21 conducting oil from the lowest tier of frustoconical element 13 to receiving chamber 21 at the bottom of the reconditioning device. The number, size and spacing of conduits 20 is important so that the conduits provide sufficient space for the free and uninhibited passage of oil from treatment chamber 12 to receiving chamber 21 to compensate for tilting of the device. Preferably each conduit 20 is sufficiently large in cross section to provide for free and unhibited passage of oil by itself. Conduits 20 are advantageously made to be an integral part of housing 10, and preferably with housing 10 defining a portion of the tubular shape thereof, one desired shape being generally rectangular. Three equally spaced conduits are adequate to compensate for any expected tilting of the device. Outlet port 17 is the passageway through which purified and reconditioned oil is returned for reuse on the equipment to which this device is attached. It will be seen that with this design the oil is returned to a large, receiving volume at the bottom of the device, and tilting the device to a substantial angle will not cause short-circuiting of the reconditioning steps. The equipment upon which this device is used can operate on hilly terrain or wherever steep angles are encountered without causing the device to overflow or to risk an engine "blow by." The volume of receiving chamber 23 should be large enough that the static head of oil in the outlet line provides enough pressure to prevent a "blow by." Normally the volume of chamber 23 is 20%–40% of the entire volume of housing 10. On an ordinary 4-6 cylinder engine this chamber might accommodate 1-3 quarts of oil which would be sufficient to prevent a "blow by." Larger engines will require proportionately larger volumes in the receiving chamber.

Figure 2:
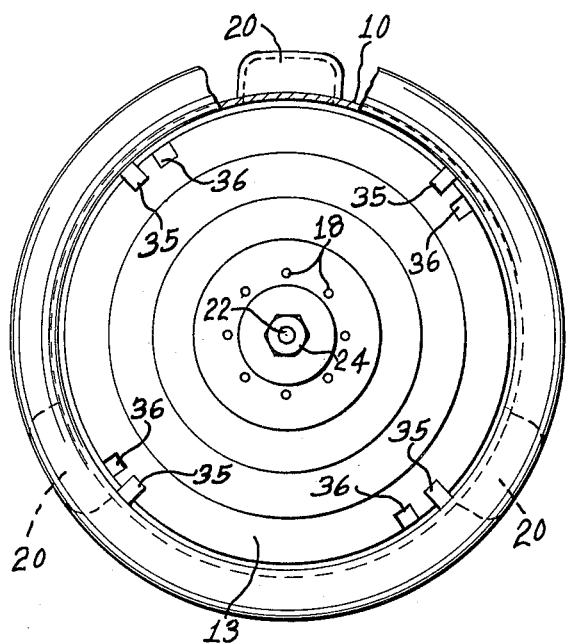
FIG. 2 is a top plan view of the device shown in FIG. 1 with the lid removed.

When the oil reconditioning device of this invention is used to purify hydraulic fluid in hydraulic power equipment, the device as shown in FIGS. 1-2 is normally adequate because the fluid is not normally contaminated with vaporizable liquid materials. In instances where the reconditioning device is employed to purify lubricating oil in an internal combustion engine the oil normally becomes contaminated with both solid materials and with vaporizable liquids such as water, petroleum fuels, etc. In such an event the embodiment of this invention as shown in FIG. 3 is preferred.

Figure 3:
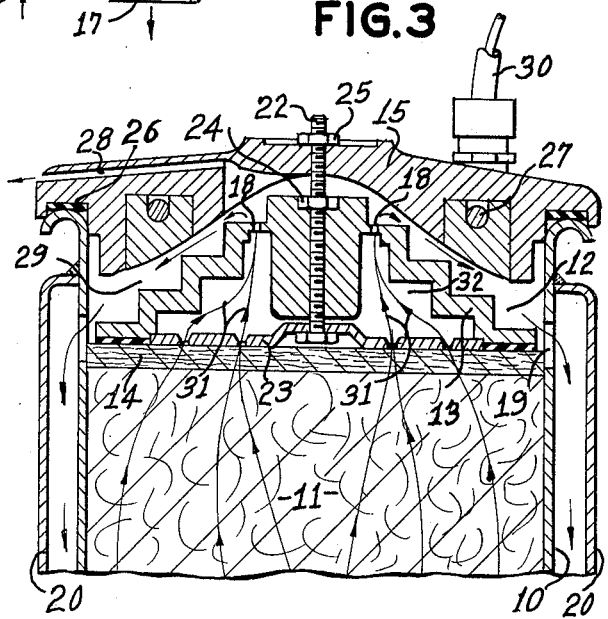
FIG. 3 is a partial elevational view of a second embodiment of this invention.

With respect to FIG. 3 it may be seen that all of the features of the device are the same as those described above with respect to FIGS. 1-2 except that in upper treatment chamber 12 there is included a means for heating the oil to vaporize the liquid contaminants and a vent to remove those vaporized contaminants. Lid 15 is fashioned to receive an electric residtance heating element 27 which raises the temperature of the outside surface of frustoconical element 13 high enough to cause the liquid contaminants in the oil cascading downwardly over that surface to vaporize and to be removed through vent 28 to the outside atmosphere. Generally the temperature necessary to accomplish these purposes is about 175°–225° F., preferably about 200° F. Lid 15 is also designed to receive lead wires 30 to provide the connection between heating element 27 and the electrical source to energize that element. Oil flows along direction lines 31 upwardly through filter chamber 11 and through inside space 32 outwardly through ports 18 and enters the space 29 between element 27 and surface 13. After passing through space 29 the heated and reconditioned oil enters outlets 19 and flows downwardly through conduits 20 to receiving chamber 21 and thence back through outlet 17 for reuse in the engine.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In an oil reconditioning device including a housing, an inlet at the lower end of the housing leading into a filter chamber in the central portion of and extending across the internal dimension of said housing for removing solid contaminants, an upper chamber extending across the internal dimension of said housing for receiving oil from said filter chamber; the improvement which comprises a purified oil receiving chamber extending across the internal dimension of said housing located below said filter chamber, a plurality of spaced conduits about said housing communicating between said upper chamber and said purified oil receiving chamber and an outlet in said purified oil receiving chamber for delivering purified oil therefrom, each of said conduits being sufficiently large in cross sectional area to conduct all of the oil flowing from said upper chamber to said purified oil receiving chamber without reducing the overall flow rate of the oil passing through said device.

2. The device of claim 1 wherein said conduits extend substantially the entire length of said housing and are positioned on the outside surface of said housing.

3. The device of claim 2 wherein said conduits are tubular elements integral with the wall of said housing and lying entirely outside of the outer surface of said housing.

4. The device of claim 3 wherein said outer surface of said housing defines a portion of each of said tubular elements.

5. The device of claim 1 wherein said inlet comprises a conduit extending from the lower outside surface of said housing through said purified oil receiving chamber to the lower inside surface of said filter chamber.

6. The device of claim 1 wherein said spaced conduits and said purified oil receiving chamber are integral with said housing, said conduits being located exteriorly of said housing and said housing defining a portion of each of said spaced conduits.

7. The device of claim 1 wherein said housing is generally cylindrical and said conduits have a generally rectangular cross section.

8. In an oil reconditioning device including a housing, an inlet at the lower end of the housing leading into a filter chamber in the central portion of and extending across the internal dimension of said housing for removing solid contaminants, and an upper chamber extending across the internal dimension of said housing for receiving oil from said filter chamber and cascading the oil over tiers on the outside heated surface of a hollow, convex frustoconical element where liquid contaminants in said oil are vaporized and vented to the atmosphere through a vent in said device; the improvement which comprises a purified oil receiving chamber extending across the internal dimension of said housing located below said filter chamber, a plurality of spaced conduits about said housing communicating between said upper chamber and said purified oil receiving chamber, and an outlet in said purified oil receiving chamber for delivering purified oil therefrom, each of said conduits being sufficiently large in cross sectional area to conduct all of the oil flowing from said upper chamber to said purified oil receiving chamber without reducing the overall flow rate of the oil passing through said device thereby to inhibit oil buildup in said upper chamber to minimize oil leakage out of said vent.

9. The device of claim 8 wherein said conduits extend substantially the entire length of said housing and are positioned on the outside surface of said housing.

10. The device of claim 9 wherein said conduits are tubular elements integral with the wall of said housing and lying entirely outside of the outer surface of said housing.

11. The device of claim 10 wherein said outer surface of said housing defines a portion of each of said tubular elements.

12. The device of claim 8 wherein said inlet comprises a conduit extending from the lower outside surface of said housing through said purified oil receiving chamber to the lower inside surface of said filter chamber.

13. The device of claim 8 wherein said housing is generally cylindrical and said conduits have a generally rectangular cross section.

* * * * *